US010333417B2

(12) United States Patent
Song et al.

(10) Patent No.: US 10,333,417 B2
(45) Date of Patent: Jun. 25, 2019

(54) DEVICE AND METHOD FOR CONTROLLING FLYBACK CONVERTER

(71) Applicant: Delta Electronics (Shanghai) CO., LTD, Shanghai (CN)

(72) Inventors: Haibin Song, Shanghai (CN); Jinfa Zhang, Shanghai (CN); Daofei Xu, Shanghai (CN)

(73) Assignee: Delta Electronics (Shanghai) CO., LTD, Shanghai (CN)

(*) Notice: Subject to any disclaimer, the term of this patent is extended or adjusted under 35 U.S.C. 154(b) by 0 days.

(21) Appl. No.: 15/944,812

(22) Filed: Apr. 4, 2018

(65) Prior Publication Data

US 2018/0294734 A1 Oct. 11, 2018

(30) Foreign Application Priority Data

Apr. 10, 2017 (CN) .......................... 2017 1 0229467
Jun. 30, 2017 (CN) .......................... 2017 1 0524232

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 3/335* (2013.01); *H02M 3/33507* (2013.01); *H02M 2001/0058* (2013.01); *Y02B 70/1475* (2013.01); *Y02B 70/1491* (2013.01)

(58) Field of Classification Search
CPC ............. H02M 3/335; H02M 3/33507; H02M 3/33592; H02M 2001/0058
USPC ............... 323/21.03–21.11; 363/21.03–21.11
See application file for complete search history.

(56) References Cited

U.S. PATENT DOCUMENTS 5,134,355 A * 7/1992 Hastings ............. H02M 1/4208 323/211
7,161,816 B2 * 1/2007 Shteynberg ......... H02M 1/4258 323/282
9,641,083 B2 * 5/2017 Song ....................... H02M 1/32
9,787,193 B2 * 10/2017 Song ....................... H02M 1/15

(Continued)

FOREIGN PATENT DOCUMENTS

CN 104539163 A 4/2015
TW 201101664 A 1/2011
TW 201640805 A 11/2016

OTHER PUBLICATIONS

The TW1OA issued by TIPO dated Jun. 4, 2018.

(Continued)

*Primary Examiner* — Fred E Finch, III
*Assistant Examiner* — Nusrat Quddus
(74) *Attorney, Agent, or Firm* — Yunling Ren

(57) ABSTRACT

A control device, which is applied to a flyback converter including an auxiliary switch, includes: an on-time setter, configured to set an on-time threshold according to a reference value and an output voltage of the flyback converter; and an on-time controller, configured to output a control signal to turn on the auxiliary switch, and turn off the auxiliary switch when on-time of the auxiliary switch reaches the on-time threshold. According to the present disclosure, it is able to achieve zero voltage switching of a primary-side switch of the flyback converter with variable outputs.

27 Claims, 15 Drawing Sheets

(56) References Cited

U.S. PATENT DOCUMENTS

| | | | | |
|---|---|---|---|---|
| 9,991,811 | B1 * | 6/2018 | Song | H02M 1/083 |
| 2014/0204625 | A1 | 7/2014 | Liu et al. | |
| 2015/0016153 | A1 * | 1/2015 | Orr | H02M 3/33538<br>363/21.04 |
| 2015/0280575 | A1 * | 10/2015 | Song | H02M 3/33507<br>363/21.12 |
| 2016/0233779 | A1 * | 8/2016 | Cohen | H02M 3/33592 |
| 2016/0268907 | A1 * | 9/2016 | Chen | H02M 3/33507 |
| 2017/0338814 | A1 * | 11/2017 | Xu | H03K 17/284 |
| 2018/0226895 | A1 * | 8/2018 | Song | H02M 3/33569 |

OTHER PUBLICATIONS

"Capacitor Clamp ZVS Flyback Converter with Synchronous Rectifier".
The CN1OA dated Apr. 18, 2019 by the CNIPA.

* cited by examiner

DEVICE AND METHOD FOR CONTROLLING FLYBACK CONVERTER

CROSS REFERENCE

This application is based upon and claims priority to Chinese Patent Application No. 201710229467.7, filed on Apr. 10, 2017, and Chinese Patent Application No. 201710524232.0, filed on Jun. 30, 2017 the entire contents thereof are incorporated herein by reference.

TECHNICAL FIELD

The present disclosure relates to the field of power electronic technologies, and more particularly, to a control device and control method applied to a flyback converter.

BACKGROUND

Flyback converter is widely adopted for low power off-line applications, such as notebook adapter, cell phone charger etc. Quasi-resonant (QR) flyback is particularly popular because of less switching loss. It operates in discontinuous current conduction mode, and achieves zero voltage switching (ZVS) at low line and partial hard switching at high line. Recently there is growing need for higher power density for adapters, and high switching frequency design accompanied by efficiency improvement is necessary to pass thermal requirement in a smaller volume. QR flyback typically operates below 150 kHz, and switching loss becomes dominant when switching frequency further increases, especially at high line condition. Soft switching flyback converter were introduced to run at higher switching frequency (300~1 MHz) with optimized efficiency. With new control method, QR flyback with synchronous rectifier (SR) can achieve ZVS for both low line and high line conditions. Before turning on the primary main switch, the SR is controlled to get inverse secondary side current, and then the inverse current is transferred to primary side to discharge parasitic capacitance of the primary main switch for ZVS. Active clamp flyback (ACF) is a two-switch topology that achieves soft switching. Operating in continuous current mode (CCM), or discontinuous current mode (DCM), it can achieve full ZVS, and furthermore, ACF recycles leakage inductance energy, which benefits both efficiency and device stress.

So far, soft switching flyback converter mentioned above is developed for fixed output voltage application. For wide range output applications such as USB PD adapter, ZVS may be lost, or efficiency may be degraded due to excessive circulation current.

Therefore, it is an urgent need at present to develop a control device and a control method that can overcome the above technical problems.

It is to be noted that the above information disclosed in this Background section is only for enhancement of understanding of the background of the present disclosure and therefore it may contain information that does not form the prior art that is already known to a person of ordinary skill in the art.

SUMMARY

An objective of the present disclosure is to provide a control device and a control method, so as to overcome, at least to a certain extent, one or more problems caused by limitation and defects of related technologies.

According to an aspect of the present disclosure, there is provided a control device, which is applied to a flyback converter. The flyback converter includes an auxiliary switch, and the control device includes:

an on-time setter, configured to set an on-time threshold according to a reference value and an output voltage of the flyback converter; and an on-time controller, configured to output a control signal to turn on the auxiliary switch, and turn off the auxiliary switch when on-time of the auxiliary switch reaches the on-time threshold.

According to an aspect of the present disclosure, there is provided a switching power supply, which includes the control device according to any one of the above embodiments.

According to an aspect of the present disclosure, there is provided a control method, which is applied to a flyback converter. The flyback converter includes an auxiliary switch, and the control method includes steps:

(a) detecting an output voltage of the flyback converter, and setting an on-time threshold according to the output voltage and a reference value; and (b) turning on the auxiliary switch according to a control signal, and turning off the auxiliary switch when on-time of the auxiliary switch reaches the on-time threshold.

According to the control device and the control method provided by the exemplary embodiments of the present disclosure, an on-time threshold is obtained according to a reference value and an output voltage of the flyback converter, and a control signal is outputted to turn on the auxiliary switch. Therefore, the on-time threshold with different outputs may be acquired according to a reference value and an output voltage of a flyback converter monitored. On-time of the auxiliary switch is adjusted according to the on-time threshold to ensure that the on-time of the auxiliary switch follows the on-time threshold. Thus, zero voltage switching of a primary-side switch in the flyback converter with different outputs may be achieved.

It should be understood that the above general description and the detailed description below are merely exemplary and explanatory, and do not limit the present disclosure.

BRIEF DESCRIPTION OF THE DRAWINGS

The accompanying drawings are incorporated in and constitute a part of this specification, illustrate embodiments conforming to the disclosure and together with the description serve to explain the principles of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
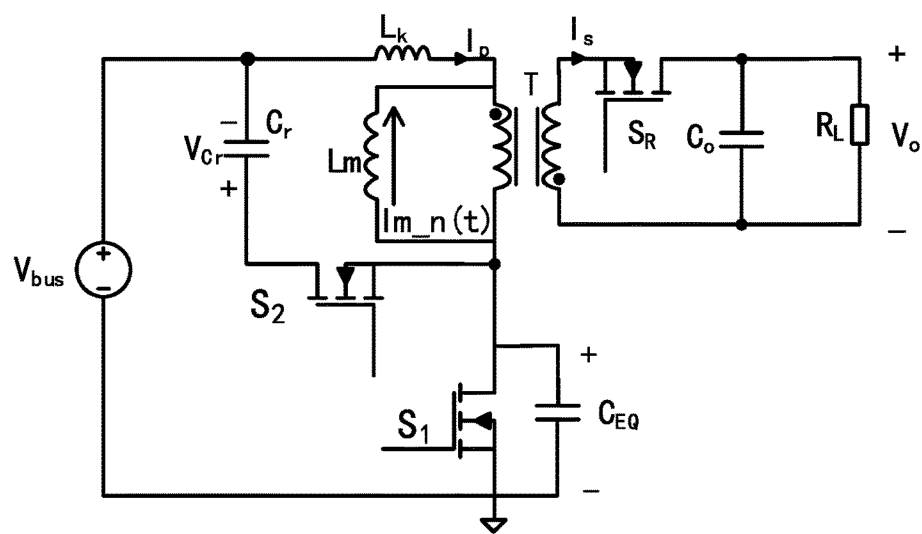
FIG. 1 schematically illustrates a circuit diagram of an active clamp flyback converter according to a typical topology.

The exemplary embodiments will now be described more fully with reference to the accompanying drawings. However, the exemplary embodiments can be implemented in a variety of forms and should not be construed as limited to the embodiments set forth herein. Rather, the embodiments are provided so that the present disclosure will be thorough and complete and will fully convey the concepts of exemplary embodiments to those skilled in the art. The features, structures, or characteristics described may be combined in one or more embodiments in any suitable manner. In the following description, numerous specific details are provided to give a full understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

Figure 2:
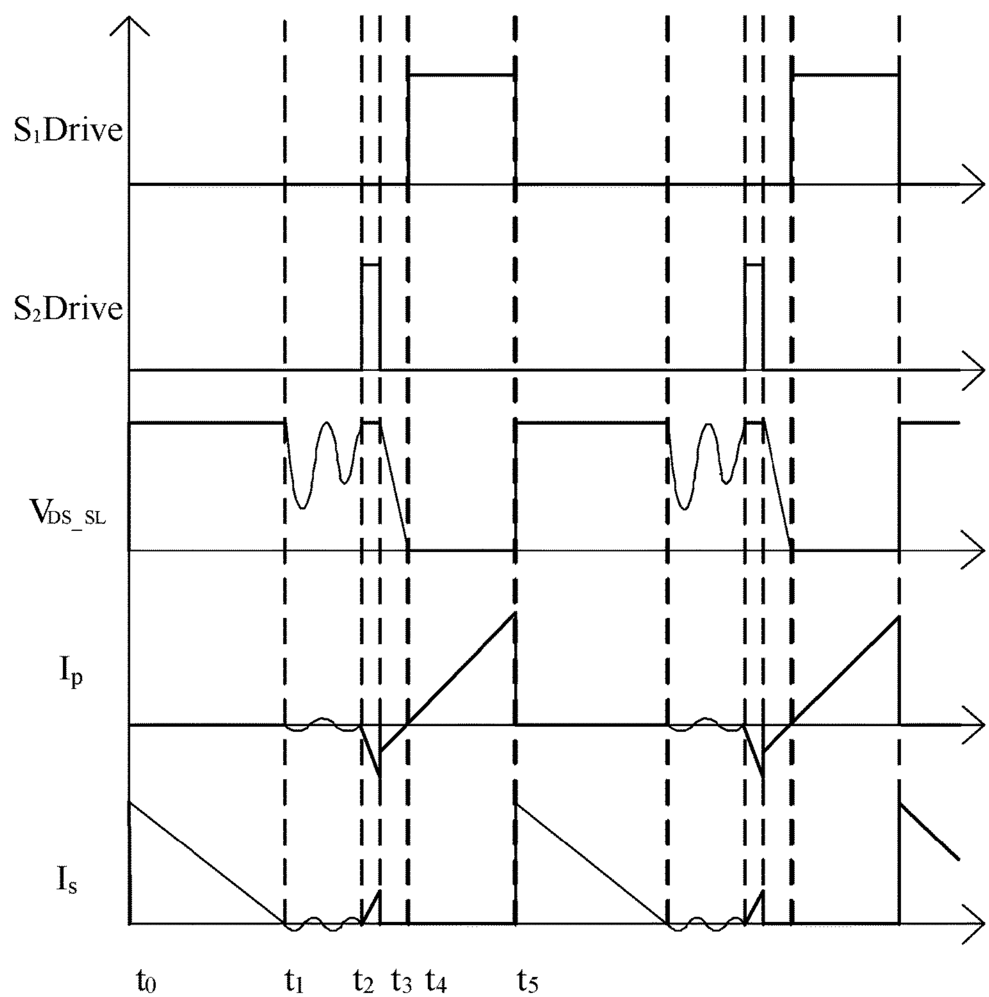
FIG. 2 schematically illustrates a discontinuous current mode control waveform diagram of an active clamp flyback converter according to a typical topology.

FIG. 1 illustrates a circuit diagram of an active clamp flyback converter according to a typical topology, by which zero voltage switching (ZVS) of a primary-side power switch $S_1$ may be achieved. An exemplary control method may be implemented by turning on a clamp switch $S_2$ for a set time (for example, $t_2$-$t_3$ in the control waveform diagram as shown in FIG. 2) only before the primary-side power switch $S_1$ is turned on.

Figure 3:
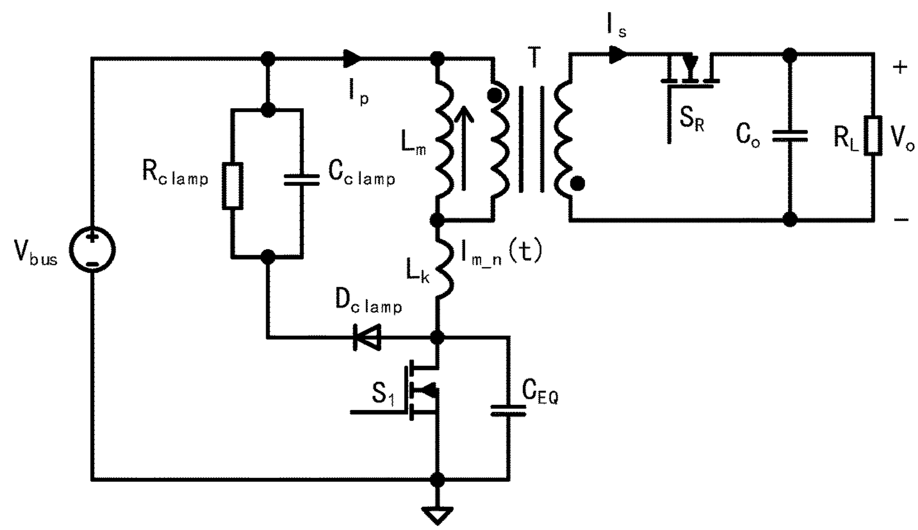
FIG. 3 schematically illustrates a circuit diagram of a RCD (Resistor Capacitor Diode) clamp flyback converter according to a typical topology.
Figure 4:
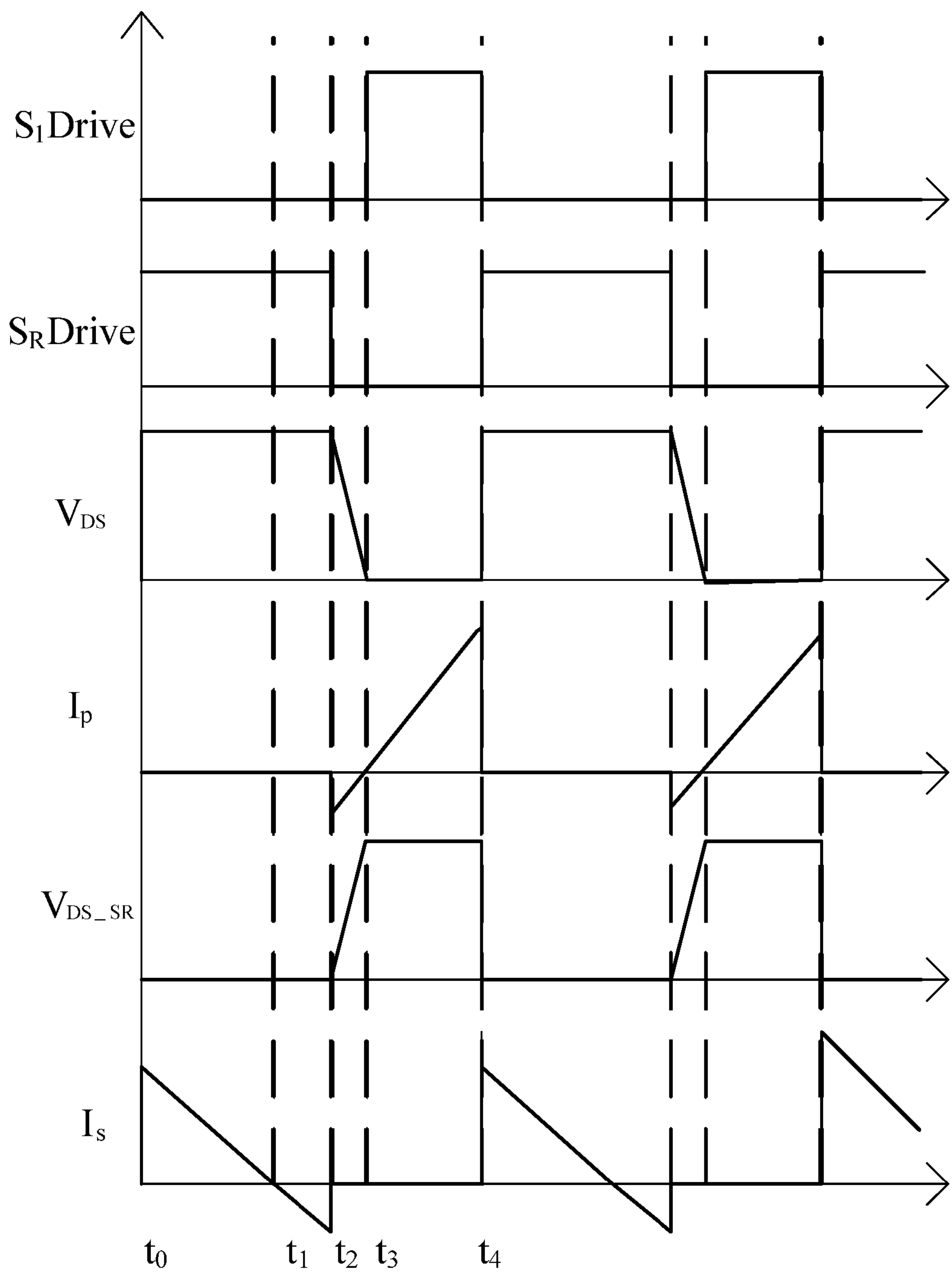
FIG. 4 schematically illustrates a discontinuous current mode boundary control waveform diagram of an RCD clamp flyback converter according to a typical topology.

FIG. 3 illustrates a circuit diagram of an RCD clamp flyback converter according to a typical topology, by which zero voltage switching (ZVS) of the primary-side power switch $S_1$ may be achieved by delaying in turning on a secondary-side synchronous rectifier $S_R$ of a quasi-resonant flyback converter. An exemplary control method for delaying in turning on the secondary-side synchronous rectifier $S_R$ may be implemented by further maintaining, after a secondary-side current $i_s$ of the synchronous rectifier $S_R$ dropping to zero, the synchronous rectifier turning on for a set time such as $t_1$-$t_2$ in the control waveform diagram as shown in FIG. 4.

The above two methods for achieving the zero voltage switching (ZVS) of the primary-side power switch $S_1$ are implemented by controlling the synchronous rectifier $S_R$ or the clamp switch $S_2$ turn-on for a set time, which is applicable to an application scenario where the output voltage is constant.

However, with the development of a power adapter, particularly the promotion of USB-PD Type-C, the application of a variable outputs becomes more and more popular. For an application scenario of the variable outputs, the above control mode is not applicable any more. This is because no matter the RCD clamp flyback converter or the active clamp flyback converter has the following basic principle of achieving the zero voltage switching (ZVS) of the primary-side power switch: before the primary-side power switch $S_1$ is turned on, a negative magnetizing current $I_{m\_n}$ is generated on a magnetizing inductor $L_m$ of a transformer, the zero voltage switching (ZVS) of the primary-side power switch $S_1$ is achieved by the negative magnetizing current $I_{m\_n}$, and the magnitude of the negative magnetizing current depends on the following formula:

$$I_{m\_n}(t) = \frac{n}{L_m} V_o t \tag{1}$$

where $L_m$ is the magnetizing inductance value of the transformer, n is a turn ratio of the transformer, $V_o$ is an output voltage value of the converter, $I_{m\_n}(t)$ is an amplitude of the negative magnetizing current, and t is on-time of the auxiliary switch, e.g. on-time after the secondary side current $I_{S\_}$ dropping to zero for the synchronous rectifier of the quasi-resonant flyback converter, or on-time before the primary side power switch is on for the clamp switch of the active clamp flyback converter.

As can be seen from the above formula, both the magnetizing inductance $L_m$ and the turn ratio n are fixed for a concrete design. When the output voltage $V_o$ is fixed, as can be seen from Formula (1), the fixed on-time t is fixed and the fixed on-time t signifies a fixed amplitude of the negative magnetizing current. Therefore, turning on the synchronous rectifier $S_R$ or the clamp switch $S_2$ for the set time t is applicable to an application scenario where the output voltage is constant. When the output voltage is variable, the fixed on-time signifies that the amplitude of the negative magnetizing current may vary with the change of the output voltage $V_o$. Taking the application of USB-PD Type-C as an example, the minimum output voltage is 5V, and the maximum output voltage is 20V. When the control method of the fixed on-time is adopted, either one of the following two results may occur:

Result A: If the set on-time may exactly satisfy the condition of the zero voltage switching (ZVS) of the primary-side power switch when the output voltage is 5V, the amplitude of the negative magnetizing current generated in an application scenario where the output voltage is 20V will be four times as much as that in an application scenario where the output voltage is 5V. Extra loss may be introduced by excessively large negative magnetizing current may introduce, and thus a negative effect may be applied on the efficiency of the converter.

Result B: If the set on-time may exactly satisfy the condition of the zero voltage switching (ZVS) of the primary-side power switch when the output voltage is 20V, the amplitude of the negative magnetizing current generated in an application scenario where the output voltage is 5V will be only ¼ of that in an application scenario where the output voltage is 20V. The primary-side power switch may be unable to achieve the zero-voltage switching due to excessively small negative magnetizing current.

Figure 6:
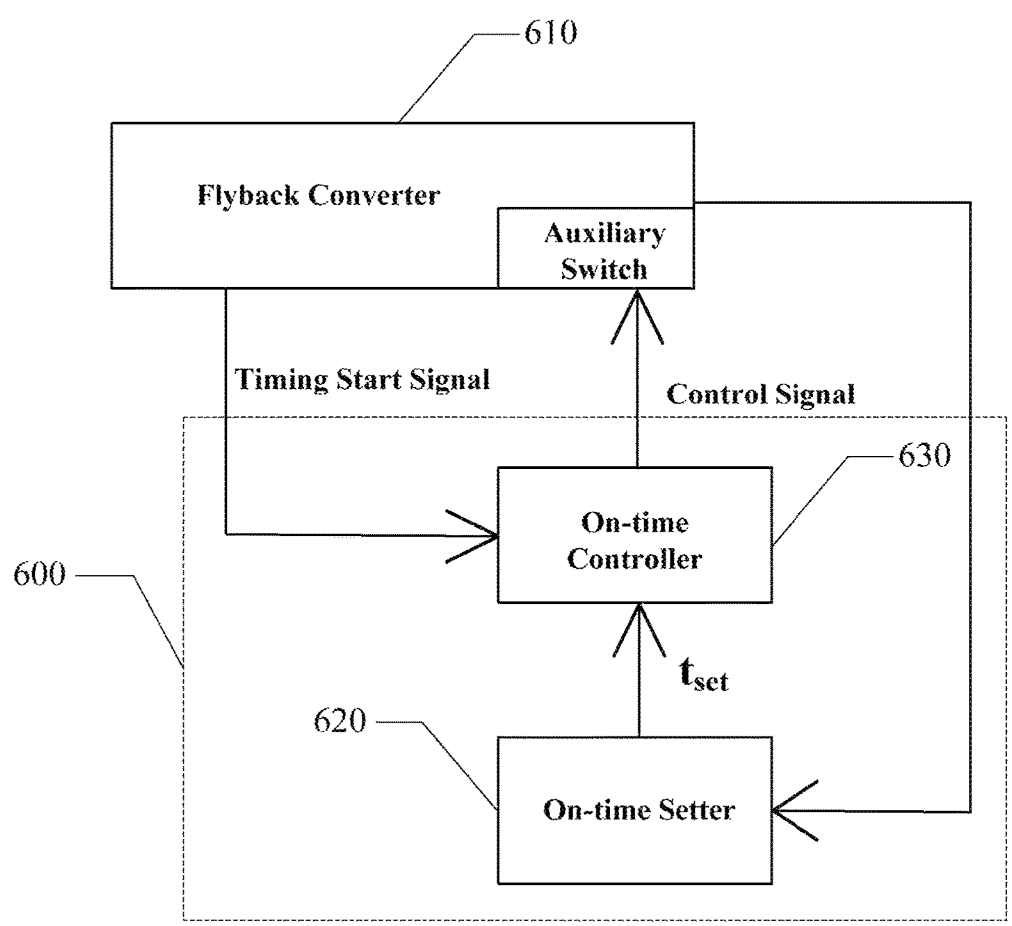
FIG. 6 schematically illustrates a control principle block diagram of a control device according to an exemplary embodiment of the present disclosure.

According to the above contents, in this exemplary embodiment, there is provided a control drive 600, referring to FIG. 6, which is used for controlling a flyback converter 610, wherein the flyback converter 610 includes an auxiliary switch. As shown in FIG. 6, the control device 600 may include: an on-time setter 620 and an on-time controller 630.

The on-time setter 620 is configured to generate an on-time threshold $t_{set}$ according to a reference value and an output voltage $V_o$.

The on-time controller 630 is configured to output a control signal to turn on the auxiliary switch, and to turn off the auxiliary switch when on-time of the auxiliary switch reaches the on-time threshold $t_{set}$. For example, the control signal can be obtained according to a timing start signal and the on-time threshold $t_{set}$.

According to the control device provided by this exemplary embodiment, following advantages may be achieved. On one hand, the on-time threshold under different circuit states may be acquired according to a reference value and an output voltage of a flyback converter monitored. On the other hand, on-time of the auxiliary switch is adjusted according to the on-time threshold to ensure that the on-time of the auxiliary switch follows the on-time threshold. Thus, zero voltage switching of a primary-side power switch in the flyback converter with different outputs may be achieved.

In this exemplary embodiment, the flyback converter further includes a primary-side switching circuit, a secondary-side rectifier, a transformer, and an output capacitor. The primary-side switching circuit includes a primary-side power switch, the secondary-side rectifier includes a first end and a second end, where the first end and the second end are electrically connected to the transformer and the output capacitor respectively. To apply to application scenarios where the output voltage is variable and achieve the zero voltage switching (ZVS) of the primary-side power switch within a whole load range and a whole input voltage range (such as 90~264 Vac), the on-time of the auxiliary switch may be directly controlled.

$$t_{set} = \frac{L_m}{n} \times \frac{I_{m\_N}}{V_o} \tag{2}$$

As can be seen from Formula (2), for a set reference $I_{m\_N}$, the on-time threshold $t_{set}$ and the output voltage $V_o$ are in an inversely proportional relationship. In this embodiment, the negative magnetizing current can be controlled by controlling the on-time of the auxiliary switch according to different output voltages.

Before the primary-side power switch is turned on, the flyback converter generates a negative magnetizing current by turning on and turning off the auxiliary switch. The turn-on of the auxiliary switch is controlled such that the on-time thereof reaches the on-time threshold $t_{set}$. And, after the auxiliary switch is turned off, the negative magnetizing current at this moment serves as an initial value, and the zero voltage switching (ZVS) of the primary-side power switch is achieved via resonance of the magnetizing inductor $L_m$ and a parasitic capacitor $C_{EQ}$ of a primary-side circuit. In the present disclosure, by reasonably setting the on-time threshold of the auxiliary switch, the zero voltage switching (ZVS) of the primary-side power switch may be achieved with different outputs voltages within a whole input voltage range. In this embodiment, the parasitic capacitor $C_{EQ}$ consists of a parasitic capacitor of the primary-side power switch $S_1$ and a parasitic capacitor of a primary-side coil of the transformer T.

It is to be noted that in this exemplary embodiment, the output voltage of the flyback converter 610 is variable. For example, the output voltage of the flyback converter 610 may be 5V, 9V, 15V or 20V and so on, which is not specially limited in the present disclosure.

Figure 5:
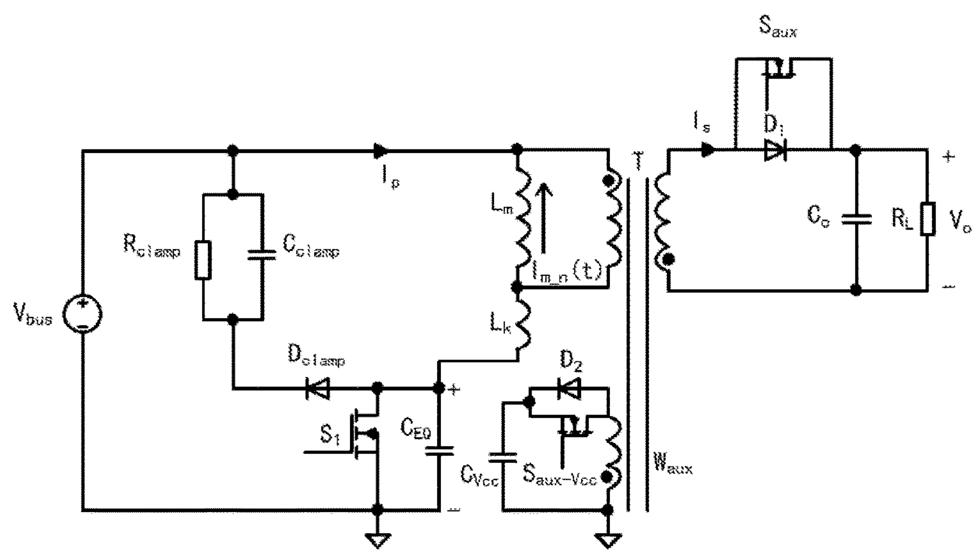
FIG. 5 schematically illustrates a circuit diagram of an RCD clamp flyback converter according to another typical topology.

In this exemplary embodiment, the flyback converter 610 may be the active clamp flyback converter as shown in FIG. 1 or the RCD clamp flyback converter as shown in FIG. 3 or FIG. 5, but the flyback converter in the exemplary embodiments of the present disclosure is not limited thereto.

Accordingly, in this exemplary embodiment, the auxiliary switch of the flyback converter 610 may be the clamp switch $S_2$ as shown in FIG. 1 or the synchronous rectifier $S_R$ as shown in FIG. 3, but the auxiliary switch in the exemplary embodiments of the present disclosure is not limited thereto. For example, the secondary side as shown in FIG. 5 is the RCD clamp flyback converter with diode rectifier, and the auxiliary switch thereof may be a switch $S_{aux}$ connected in parallel with a diode $D_1$, or the auxiliary switch thereof may be a switch $S_{aux\_VCC}$ connected in series with an auxiliary winding $W_{aux}$.

It is to be noted that in this exemplary embodiment, an operating mode of the flyback converter may be a discontinuous current mode or a discontinuous current mode boundary, which is not specially limited by the present disclosure.

Figure 7:
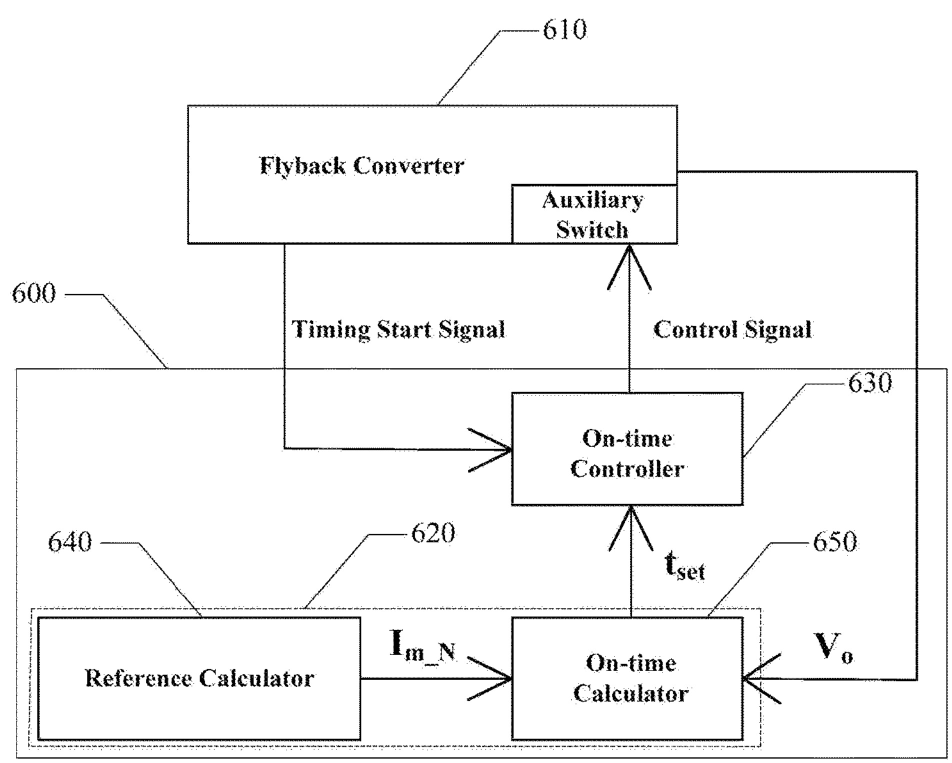
FIG. 7 schematically illustrates a control principle block diagram of a control device according to another exemplary embodiment of the present disclosure.

Further, as shown in FIG. 7, in this exemplary embodiment, in order to reasonably set the reference value and the on-time threshold, the on-time setter 620 may further include: a reference calculator 640 and an on-time calculator 650. The reference calculator 640 is configured to set the reference value $I_{m\_N}$ according to an input voltage or/and an output voltage of the flyback converter. The on-time calculator 650 is configured to set the on-time threshold $t_{set}$ according to the reference value $I_{m\_N}$ and the output voltage $V_o$ of the flyback converter.

In an embodiment, the on-time calculator may include a multiplying or dividing circuit, but is not limited thereto. The multiplying or dividing circuit receives the reference value $I_{m\_N}$ and the output voltage $V_o$ of the flyback converter, and calculates the on-time threshold $t_{set}$ through the Formula (2).

Figure 8:
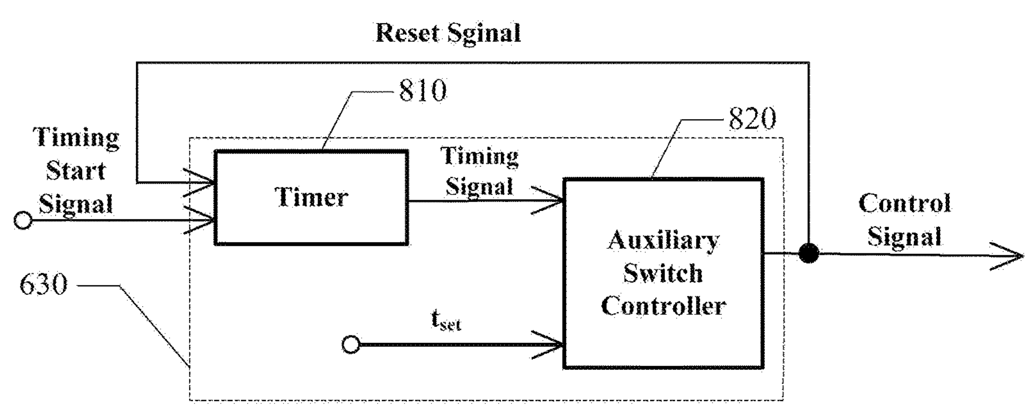
FIG. 8 schematically illustrates a circuit diagram of an on-time controller according to still another exemplary embodiment of the present disclosure.

In this exemplary embodiment, the on-time controller 630 may be achieved in many ways. FIG. 8 illustrates the on-time controller 630 according to an embodiment of the present disclosure. As shown in FIG. 8, the on-time controller includes a timer 810 and an auxiliary switch controller 820, where the timer 810 is configured to start according to the timing start signal and generate a timing signal. The auxiliary switch controller 820 is configured to generate a control signal according to the timing signal.

In this exemplary embodiment, the auxiliary switch controller 820 turns on the auxiliary switch according to the timing start signal. The timing signal gradually increases after the timer 810 starts, and when the timing signal is greater than or equal to the on-time threshold $t_{set}$, the auxiliary switch controller 820 turns off the auxiliary switch.

Figure 9:
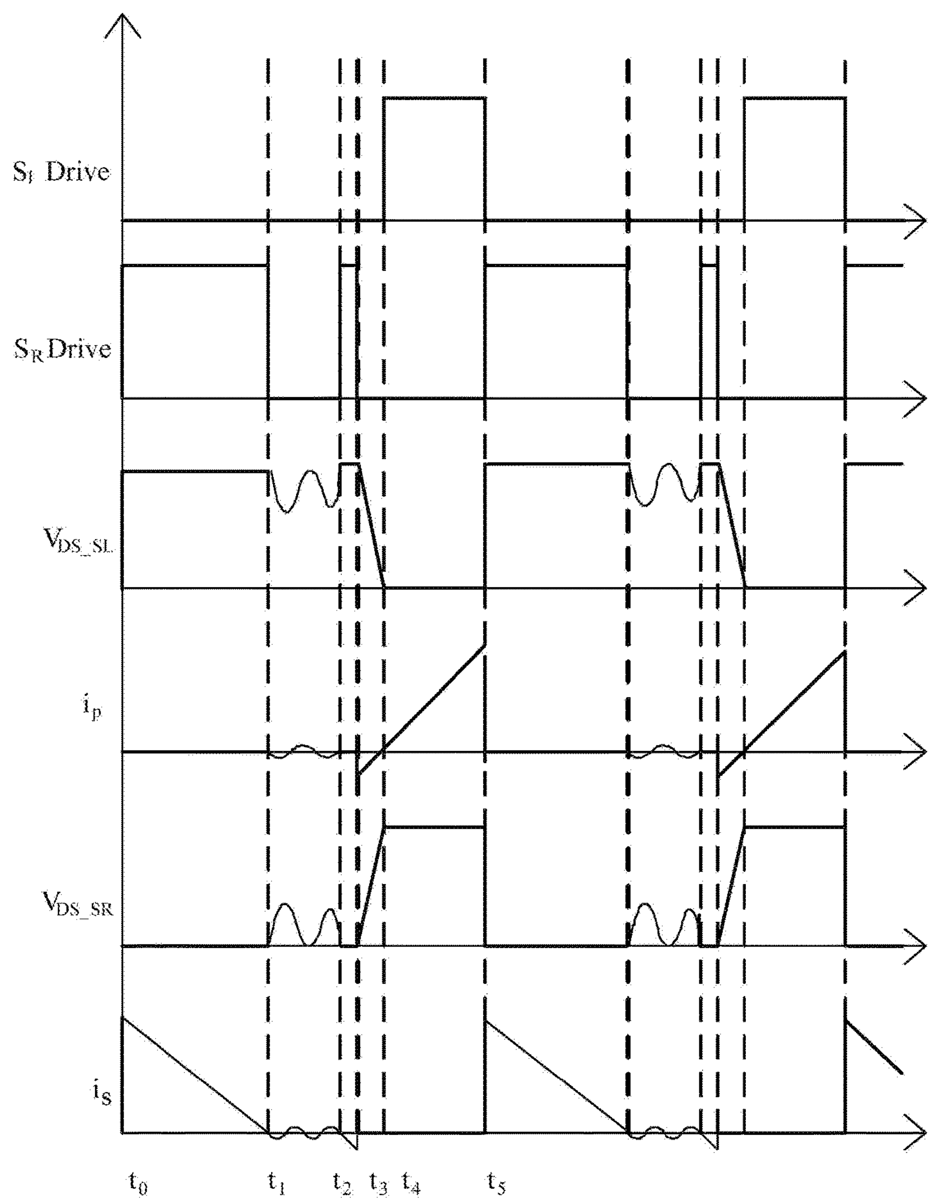
FIG. 9 schematically illustrates a discontinuous current mode control waveform diagram of an RCD clamp flyback converter according to still another exemplary embodiment of the present disclosure.

In this exemplary embodiment, for the discontinuous conduction mode, the timing start signal of the timer 810 may be obtained via the turn-on signal of the auxiliary switch. As shown in FIG. 2, at the moment of $t_2$, a rising edge signal of the drive signal $S_2$ is the turn-on signal of the auxiliary switch. As shown in FIG. 9, at the moment of $t_2$, a rising edge signal of the drive signal $S_R$ is the turn-on signal of the auxiliary switch, and the timing start signal may be obtained by detecting the rising edge signal. In some embodiment, the timing start signal may be synchronized with the rising edge signal, or may be obtained by delaying the rising edge signal.

Further, in this exemplary embodiment, for the discontinuous current mode boundary, the timing start signal of the timer may be obtained by detecting a zero crossing point (for example, the moment $t_1$ in FIG. 4) of the negative magnetizing current. Specifically, detecting the zero crossing point of the negative magnetizing current may be achieved by means of a current transformer, a sampling resistor, or an on-state resistance of a power device such as an on-state resistance of the auxiliary switch.

Figure 10:
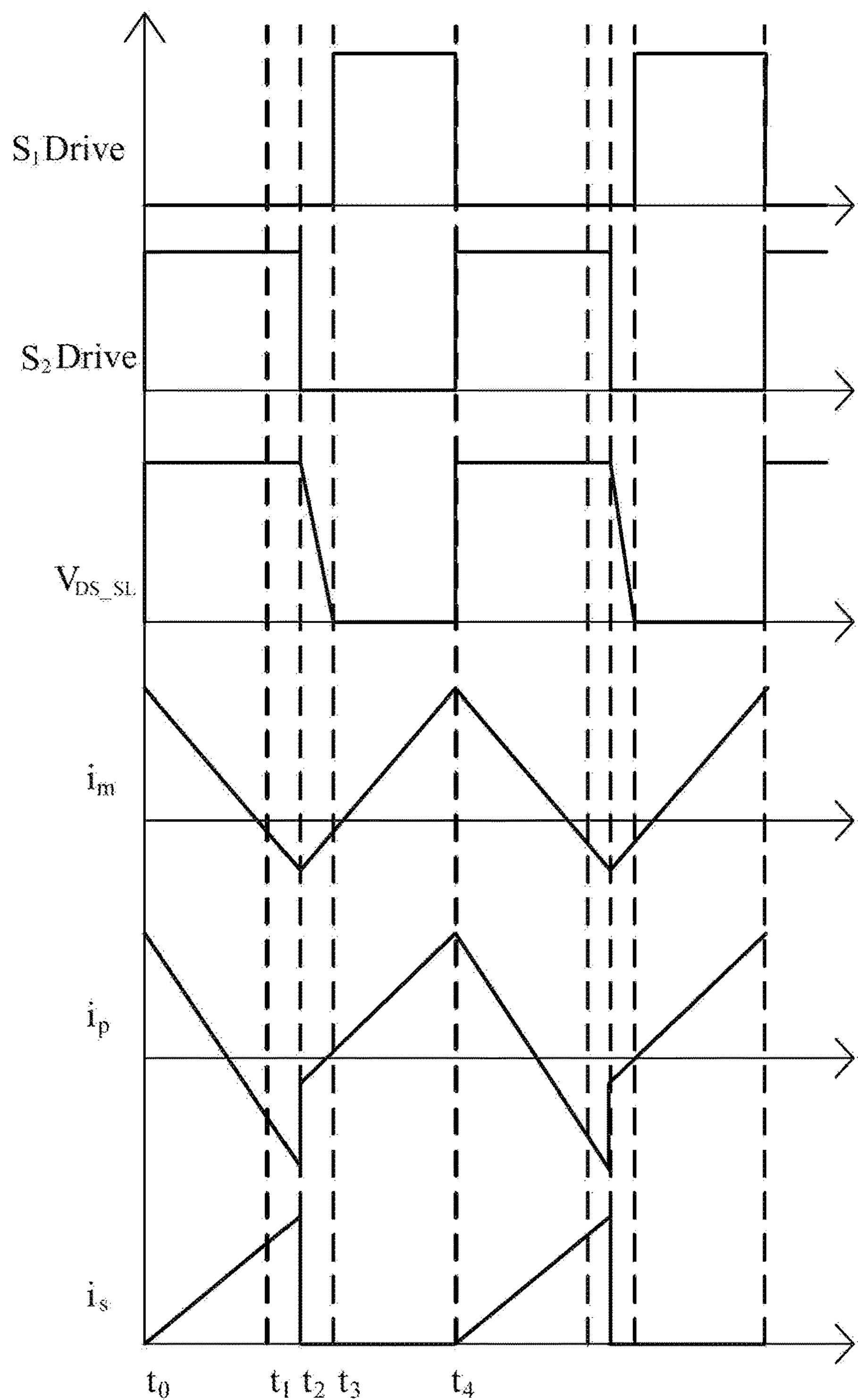
FIG. 10 schematically illustrates a discontinuous current mode boundary control waveform diagram of an active clamp flyback converter according to still another exemplary embodiment of the present disclosure.

In an embodiment, the timer 810 also implements resetting according to a reset signal. Further, in this exemplary embodiment, the reset signal of the timer may be obtained via the turn-off signal of the auxiliary switch. The reset signal of the timer may be synchronized with the turn-off signal of the auxiliary switch, or may be obtained by delaying the turn-off signal. As shown in FIG. 2, at the moment of $t_3$, a falling edge signal of the drive signal $S_2$ is the turn-off signal of the auxiliary switch. As shown in FIG. 9, at the moment of $t_3$, a falling edge signal of the drive signal $S_R$ is the turn-off signal of the auxiliary switch. Or as shown in FIG. 10, at the moment of $t_2$, a falling edge signal of the drive signal $S_2$ is the turn-off signal of the auxiliary switch. The reset signal may be obtained by detecting the falling edge signal. And the reset signal may be synchronized with the falling edge signal, or may be obtained by delaying the falling edge signal.

In this exemplary embodiment, the negative magnetizing current is controlled by controlling the on-time of the auxiliary switch, and different methods are provided for different flyback converters. In the following, the RCD clamp flyback converter and the active clamp flyback converter in the discontinuous current mode are illustrated respectively.

Figure 11:
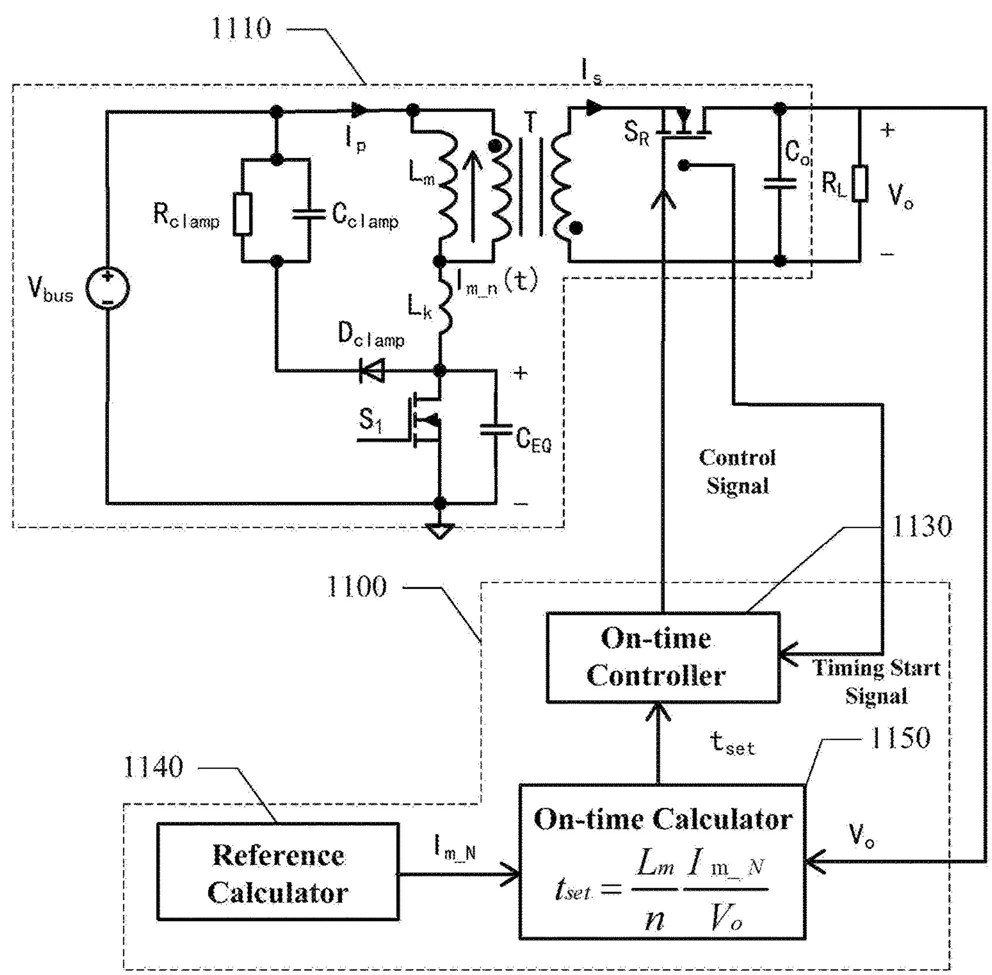
FIG. 11 schematically illustrates a specific embodiment of an on-time control method of an RCD clamp flyback converter according to still another exemplary embodiment of the present disclosure.

FIG. 11 illustrates a specific embodiment of a control device. As shown in FIG. 11, the control device 1100 is configured to control the flyback converter 1110. The control device 1100 includes: an on-time controller 1130, a reference calculator 1140, and an on-time calculator 1150. The flyback converter 1110 is an RCD clamp flyback converter, including a primary-side switching circuit, a secondary-side rectifier, a transformer T and an output capacitor $C_o$. The primary-side switching circuit includes a primary-side power switch $S_1$, the secondary-side rectifier includes a synchronous rectifier $S_R$, and the secondary-side rectifier is electrically connected to the transformer T and the output capacitor $C_o$ respectively.

In this embodiment, the on-time calculator 1150 obtains an on-time threshold $t_{set}$ according to the output voltage signal $V_o$ monitored and the reference value $I_{m\_N}$ outputted by the reference calculator 1140, and delivers the on-time threshold $t_{set}$ to the on-time controller 1130. The control device 1100 obtains the timing start signal via a turn-on signal of secondary conduction of the synchronous rectifier $S_R$, such as the drive signal of the $S_R$ at the moment of $t_2$ in FIG. 9. The on-time controller 1130 acquires the on-time threshold $t_{set}$ and the timing start signal, so as to output the control signal to turn on the synchronous rectifier $S_R$, and turn off the synchronous rectifier $S_R$ when on-time of the auxiliary switch reaches the on-time threshold $t_{set}$. Meanwhile, the on-time controller 1130 implements resetting according to the reset signal generated by the turn-off signal of synchronous rectifier $S_R$.

Figure 12:
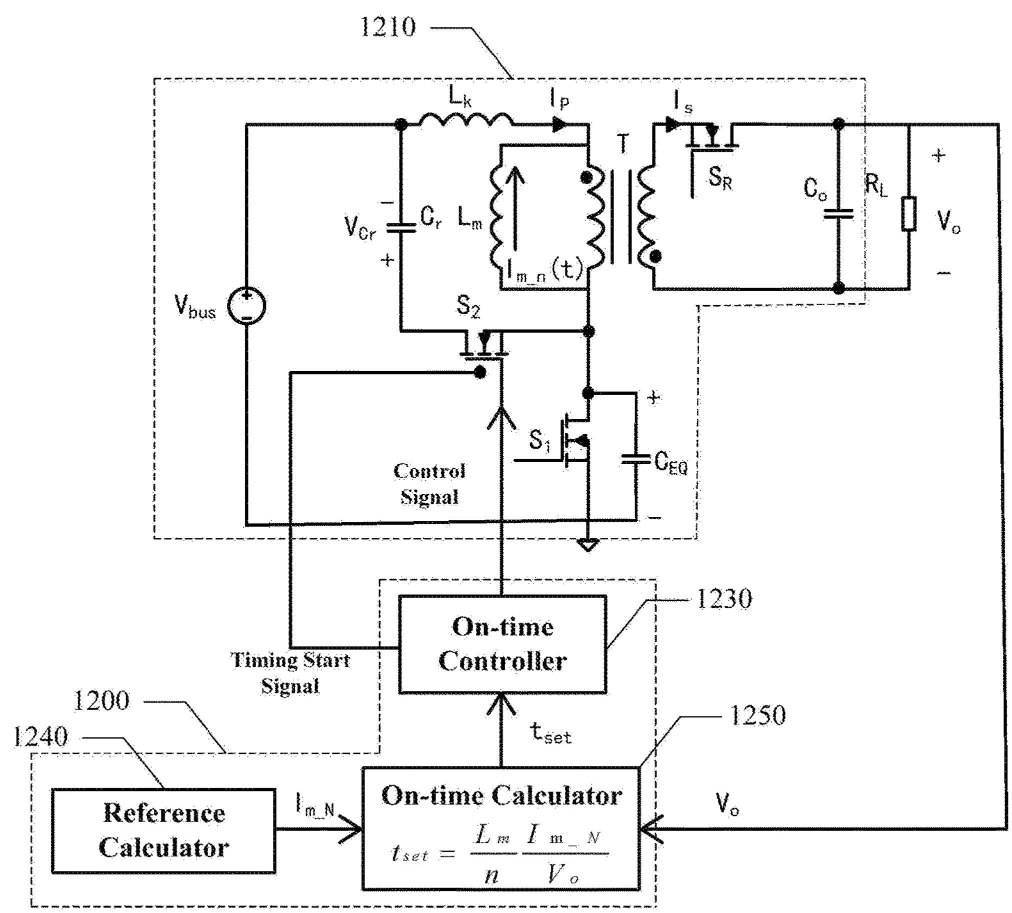
FIG. 12 schematically illustrates a specific embodiment of an on-time control method of an active clamp flyback converter according to still another exemplary embodiment of the present disclosure.

FIG. 12 illustrates another specific embodiment of a control device. As shown in FIG. 12, the control device 1200 is configured to control the flyback converter 1210. The control device 1200 includes: an on-time controller 1230, a reference calculator 1240, and an on-time calculator 1250. The flyback converter 1210 is an active clamp flyback converter, including a primary-side switching circuit, a secondary-side rectifier, a transformer T and an output capacitor $C_o$. The primary-side switching circuit includes a primary-side power switch $S_1$ and a clamp switch $S_2$, the secondary-side rectifier includes a synchronous rectifier $S_R$, and the secondary-side rectifier is electrically connected to the transformer T and the output capacitor $C_o$ respectively.

In this embodiment, the on-time calculator 1250 obtains an on-time threshold $t_{set}$ according to the output voltage signal $V_o$ monitored and the reference value $I_{m\_N}$ outputted by the reference calculator 1240, and delivers the on-time threshold $t_{set}$ to the on-time controller 1230. The control device 1200 obtains the timing start signal via a turn-on signal of the clamp switch $S_2$.

The on-time controller 1230 acquires the timing start signal and the on-time threshold $t_{set}$, so as to output the control signal to turn on the clamp switch $S_2$, and turn off the clamp switch $S_2$ when on-time of the auxiliary switch reaches the on-time threshold $t_{set}$. Meanwhile, the on-time controller 1230 implements resetting according to the reset signal generated by the turn-off signal of clamp switch $S_2$.

In addition, in each exemplary embodiment of the present disclosure, a reference calculator is included, which is configured to set the reference value $I_{m\_N}$. For setting the reference value, in case of low voltage input ($V_{bus}<nV_o$), the zero voltage switching (ZVS) of a primary-side power transistor may be achieved without the aid of the negative magnetizing current; and in case of high voltage input ($V_{bus}>nV_o$), to achieve the zero voltage switching (ZVS) of the primary-side power transistor, the minimum amplitude of the negative magnetizing current may satisfy the formula (3):

$$I_{m\_N} > \frac{\sqrt{V_{bus}^2 - (nV_o)^2}}{\sqrt{L_m / C_{EQ}}} \quad (3)$$

where $I_{m\_N}$ denotes the reference value, $V_{bus}$ denotes an input voltage, $V_O$ denotes an output voltage, n denotes the turn ratio of the transformer, $L_m$ denotes an magnetizing inductance value, and $C_{EQ}$ denotes a parasitic capacitance value.

According to the above Formula (3), for a concrete circuit design, n, $L_m$ and $C_{EQ}$ are fixed. To achieve the zero voltage switching (ZVS) of the primary-side power transistor, the reference value is related to the input voltage $V_{bus}$ and the output voltage $V_O$. Thus, the reference calculator may adjust the reference value according to the input voltage and the output voltage of the flyback converter.

However, to adjust the reference value $I_{m\_N}$, two variables may be monitored: the input voltage $V_{bus}$ and the output voltage $V_O$, which makes the above control so complex. The effect of the output voltage on the reference value may be neglectable when the flyback converter operates in case of high voltage input ($V_{bus}$>$nV_O$). That is, the reference value may be merely related to the input voltage, and thus setting the reference value may be greatly simplified. Accordingly, Formula (3) may be simplified as following Formula (4):

$$I_{m\_N} > \frac{V_{bus}}{\sqrt{L_m / C_{EQ}}} \quad (4)$$

Thus, the reference calculator may set the reference value according to the input voltage of the flyback converter.

In this embodiment, there may be two methods for setting the reference value as below.

In a method for setting a fixed reference value, in order to achieve the zero voltage switching (ZVS) of the primary-side power switch within a whole input voltage range, the reference value is set according to the maximum input voltage, namely:

$$I_{m\_N} = \frac{V_{bus\_max}}{\sqrt{L_m / C_{EQ}}} \quad (5)$$

where $V_{bus\_max}$ denotes the maximum value of the input voltage.

For the method for setting a fixed reference value, when the input voltage is the maximum value, the zero voltage switching (ZVS) of the primary-side power switch may be exactly achieved. However, when the input voltage is a low voltage, the amplitude of the negative magnetizing current generated by this control method is greater than the amplitude of the negative magnetizing current required for achieving the zero voltage switching (ZVS) of the primary-side power transistor, by which extra loss may be caused and thus the efficiency optimization may be impacted. The method for setting a fixed reference value may be used in an application scenario where efficiency requirements are not so critical.

For an application scenario where the efficiency requirements are critical, a method for setting a reference value varying with the input voltage may be employed to optimize the efficiency of the converter. Therefore, the reference value may be set as:

$$I_{m\_N}(V_{bus}) = \frac{V_{bus}}{\sqrt{L_m / C_{EQ}}} \quad (6)$$

where $I_{m\_N}$ ($V_{bus}$) denotes the reference value.

For a certain circuit design, the magnetizing inductance $L_m$ and the parasite capacitance $C_{EQ}$ are fixed. As can be known from the above Formula (6), the reference value is proportional to the input voltage $V_{bus}$, and the reference calculator may directly calculate the reference value $I_{m\_N}$ according to the input voltage value $V_{bus}$ detected by an input voltage detector.

Figure 13:
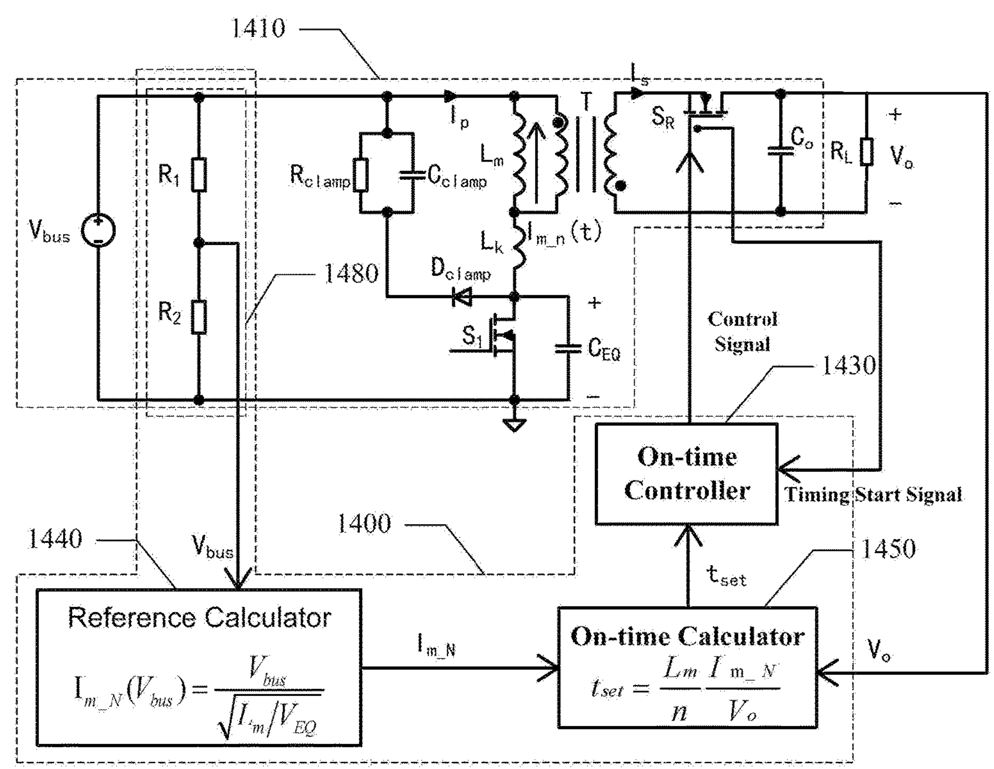
FIG. 13 schematically illustrates a specific embodiment of a method for setting a reference value of an RCD clamp flyback converter that varies with an input voltage according to still another exemplary embodiment of the present disclosure.

FIG. 13 illustrates still another specific embodiment of a control device. The topology in FIG. 13 is similar to that in FIG. 11, but the topology in FIG. 13 further includes a specific example of the reference calculator. As shown in FIG. 13, the control device 1400 further includes an input voltage detector 1480. In this embodiment, the input voltage detector 1480 includes a first resistor $R_1$ and a second resistor $R_2$. The input voltage information $V_{bus}$ is detected by dividing voltage of the first resistor $R_1$ and the second resistor $R_2$. The input voltage detector 1480 outputs the input voltage information $V_{bus}$ to the reference calculator 1440 configured to set a reference value $I_{m\_N}$. The reference value $I_{m\_N}$ is delivered to an on-time calculator 1450. The on-time calculator 1450 calculates an on-time threshold $t_{set}$ according to the reference value $I_{m\_N}$ and an output voltage $V_o$, and outputs the on-time threshold $t_{set}$ to an on-time controller 1430. A timing start signal is obtained via a secondary conduction turn-on signal (such as the drive signal of $S_R$ at the moment of $t_2$ in FIG. 9) of the synchronous rectifier to enable the on-time controller 1430. The on-time controller 1430 acquires the on-time threshold $t_{set}$ and the timing start signal, so as to output the control signal to turn on the synchronous rectifier $S_R$, and turn off the synchronous rectifier $S_R$ when on-time of the auxiliary switch reaches the on-time threshold $t_{set}$. Meanwhile, the on-time controller 1430 achieves resetting according to the reset signal generated by the turn-off signal of synchronous rectifier $S_R$.

Figure 14:
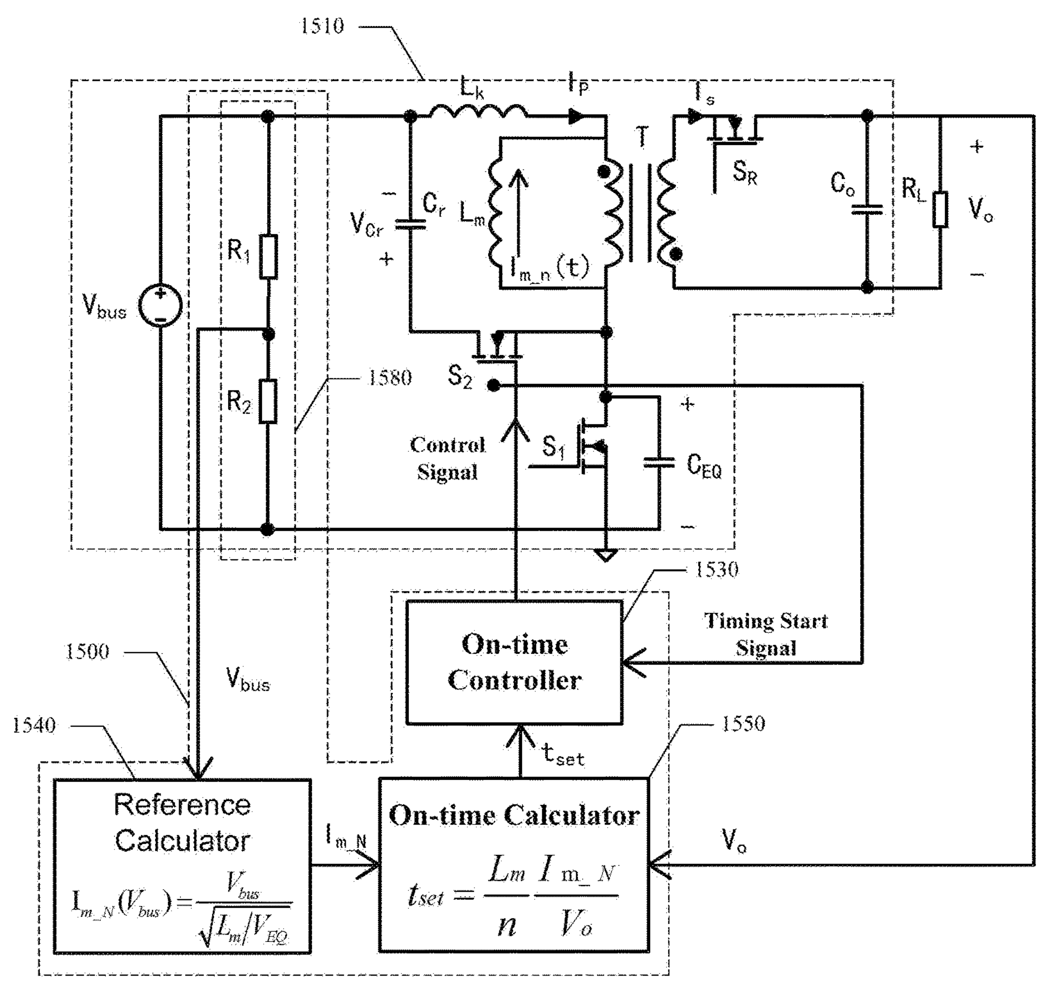
FIG. 14 schematically illustrates a specific embodiment of a method for setting a reference value of an active clamp flyback converter that varies with an input voltage according to still another exemplary embodiment of the present disclosure.

FIG. 14 illustrates still another specific embodiment of a control device. The topology in FIG. 14 is similar to that in FIG. 12 except a main difference, which lies in that the auxiliary switch in FIG. 14 is the clamp switch $S_2$ of an active clamp flyback converter.

Figure 15:
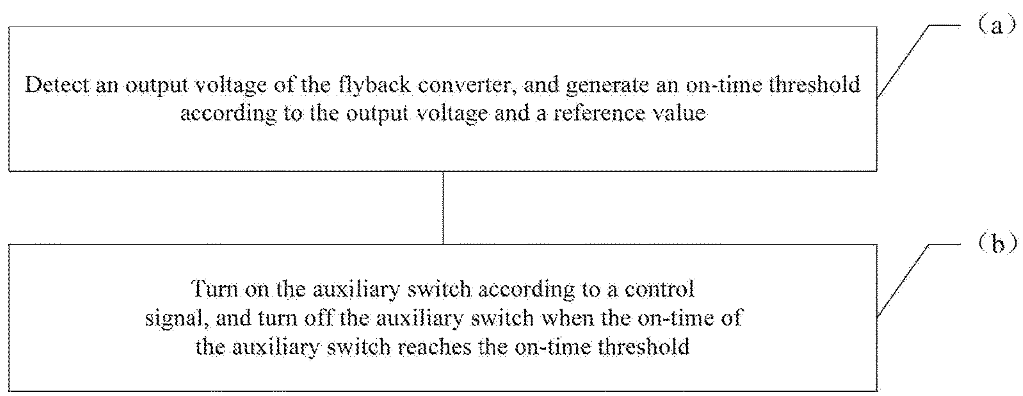
FIG. 15 schematically illustrates a flowchart of a control method according to still another exemplary embodiment of the present disclosure.

In addition, in this exemplary embodiment, there is further provided a control method, which may be applied to the flyback converter as shown in FIG. 6-FIG. 14. The flyback converter includes an auxiliary switch. Referring to FIG. 15, the control method may include following steps.

In step (a), an output voltage of the flyback converter is detected, and an on-time threshold is generated according to the output voltage and a reference value.

In step (b), the auxiliary switch is turned on according to a control signal, and the auxiliary switch is turned off when the on-time of the auxiliary switch reaches the on-time threshold.

On one hand, the on-time threshold with different outputs may be acquired according to a reference value and an output voltage of a flyback converter. On the other hand, on-time of the auxiliary switch is adjusted according to the on-time threshold to ensure that the on-time of the auxiliary switch follows the on-time threshold. Thus, zero voltage switching of a primary-side switch in the flyback converter with different outputs may be achieved.

Further, in this exemplary embodiment, the auxiliary switch may be a synchronous rectifier, a clamp switch, a switch connected in parallel with a secondary-side rectifier of the flyback converter, or a switch connected in series with an auxiliary winding of the flyback converter.

Further, in this exemplary embodiment, in a discontinuous current mode, the timing start signal may be obtained by detecting a turn-on signal of the auxiliary switch; and in a discontinuous current mode boundary, the timing start signal may be obtained by detecting a zero crossing point of the negative magnetizing current.

Furthermore, in this exemplary embodiment, the step (a) may further include:

generating the on-time threshold by calculating according to the output voltage and the reference value through a division operation.

Furthermore, in this exemplary embodiment, the control method may further include step (c).

In step (c), after the auxiliary switch is turned off, zero voltage switching of a primary-side power switch of the flyback converter is achieved by resonance of a magnetizing inductor and a parasitic capacitor in the flyback converter.

Each step in the control method of this exemplary embodiment corresponds, one to one, to functions of each unit or module in the control device, and thus is not unnecessarily elaborated herein.

Furthermore, another exemplary embodiment of the present disclosure provides a switching power supply, which may include the control device according to any one of the preceding embodiments. The switching power supply of this exemplary embodiment adopts the control device, and thus at least has all the corresponding advantages of the control device.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only restricted by the appended claims.

What is claimed is:

1. A control device, applied to a flyback converter, the flyback converter comprising an auxiliary switch, the control device comprising:

an on-time setter, configured to set an on-time threshold according to a reference value and an output voltage of the flyback converter;

an on-time controller, configured to output a control signal to turn on the auxiliary switch, and to turn off the auxiliary switch when on-time of the auxiliary switch reaches the on-time threshold; wherein, the on-time setter further comprising:

a reference calculator, configured to generate the reference value; and an on-time calculator, configured to obtain the on-time threshold according to the reference value and the output voltage of the flyback converter.

2. The control device according to claim 1, wherein the flyback converter comprises a Resistor Capacitor Diode (RCD) clamp flyback converter or an active clamp flyback converter.

3. The control device according to claim 1, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

4. The control device according to claim 1, wherein the on-time controller is configured to output the control signal according to a timing start signal.

5. The control device according to claim 4, wherein the on-time controller comprises a timer and an auxiliary switch controller;

wherein the timer is configured to receive the timing start signal, and generate a timing signal when the timer is started according to the timing start signal; and wherein the auxiliary switch controller is configured to receive the timing signal, and generate the control signal according to the timing signal.

6. The control device according to claim 5, wherein the auxiliary switch controller is configured to turn on the auxiliary switch according to the timing start signal.

7. The control device according to claim 5, wherein when the timing signal is greater than or equal to the on-time threshold, the auxiliary switch controller turns off the auxiliary switch.

8. The control device according to claim 5, wherein the timer is further configured to reset the timer according to a reset signal.

9. The control device according to claim 5, wherein in a discontinuous current mode of the flyback converter, the timing start signal is obtained by detecting a turn-on signal of the auxiliary switch; and in a discontinuous current mode boundary of the flyback converter, the timing start signal is obtained by detecting a zero crossing point of the negative magnetizing current in the flyback converter.

10. The control device according to claim 8, wherein the reset signal is obtained by detecting a turn-off signal of the auxiliary switch.

11. The control device according to claim 1, wherein the reference calculator is configured to set the reference value according to an input voltage of the flyback converter; or the reference calculator is configured to set the reference value according to an input voltage of the flyback converter and an output voltage of the flyback converter.

12. The control device according to claim 1, wherein an output voltage of the flyback converter is variable.

13. A switching power supply, comprising the control device applied to a flyback converter comprising an auxiliary switch, wherein the control device comprises:

an on-time setter, configured to set an on-time threshold according to a reference value and an output voltage of the flyback converter;

an on-time controller, configured to output a control signal to turn on the auxiliary switch, and to turn off the auxiliary switch when on-time of the auxiliary switch reaches the on-time threshold; wherein, the on-time setter further comprising:

a reference calculator, configured to generate the reference value; and an on-time calculator, configured to obtain the on-time threshold according to the reference value and the output voltage of the flyback converter.

14. A control method, applied to a flyback converter, the flyback converter comprising an auxiliary switch, the control method comprising steps:

(a) detecting an output voltage of the flyback converter, and setting an on-time threshold according to the output voltage and a reference value; and (b) turning on the auxiliary switch according to a control signal, and turning off the auxiliary switch when on-time of the auxiliary switch reaches the on-time threshold, wherein the Step (a) furthermore comprises: generating the on-time threshold according to the output voltage and the reference value through a division operation.

15. The control method according to claim 14, wherein the flyback converter comprises a Resistor Capacitor Diode (RCD) clamp flyback converter or an active clamp flyback converter.

16. The control method according to claim 14, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

17. The control method according to claim 16, wherein the Step (b) comprises:

outputting the control signal according to a timing start signal.

18. The control method according to claim 17, wherein the Step (b) comprises:

generating a timing signal when starting a timer according to a timing start signal; and generating the control signal according to the timing signal.

19. The control method according to claim 17, wherein the auxiliary switch is turned on according to the timing start signal.

20. The control method according to claim 17, wherein the auxiliary switch is turned off when the timing signal is greater than or equal to the on-time threshold.

21. The control method according to claim 18, wherein the Step (b) further comprises:

resetting the timer according to a reset signal.

22. The control method according to claim 17, wherein in a discontinuous current mode of the flyback converter, the timing start signal is obtained by detecting a turn-on signal of the auxiliary switch; and in a discontinuous current mode boundary of the flyback converter, the timing start signal is obtained by detecting a zero crossing point of the negative magnetizing current in the flyback converter.

23. The control method according to claim 21, wherein the reset signal is obtained by detecting a turn-off signal of the auxiliary switch.

24. The control method according to claim 14, further comprising:

(c) after the auxiliary switch is turned off, achieving zero voltage switching of a primary-side power switch of the flyback converter by resonance of an magnetizing inductor and a parasitic capacitor in the flyback converter.

25. The control method according to claim 14, wherein the Step (a) further comprises:

setting the reference value according to an input voltage of the flyback converter; or setting the reference value according to an input voltage of the flyback converter and an output voltage of the flyback converter.

26. The control method according to claim 25, wherein the Step (a) further comprises:

setting the negative magnetizing current reference value according to a maximum value of the input voltage of the flyback converter.

27. The control method according to claim 26, wherein an output voltage of the flyback converter is variable.

* * * * *